April 20, 1948.  J. A. CUPLER  2,439,965
DRILL PRESS
Filed Jan. 9, 1943   6 Sheets-Sheet 1

Inventor
J. A. Cupler
By Townsend & Colton
Attorney

April 20, 1948. J. A. CUPLER 2,439,965
DRILL PRESS
Filed Jan. 9, 1943 6 Sheets-Sheet 3
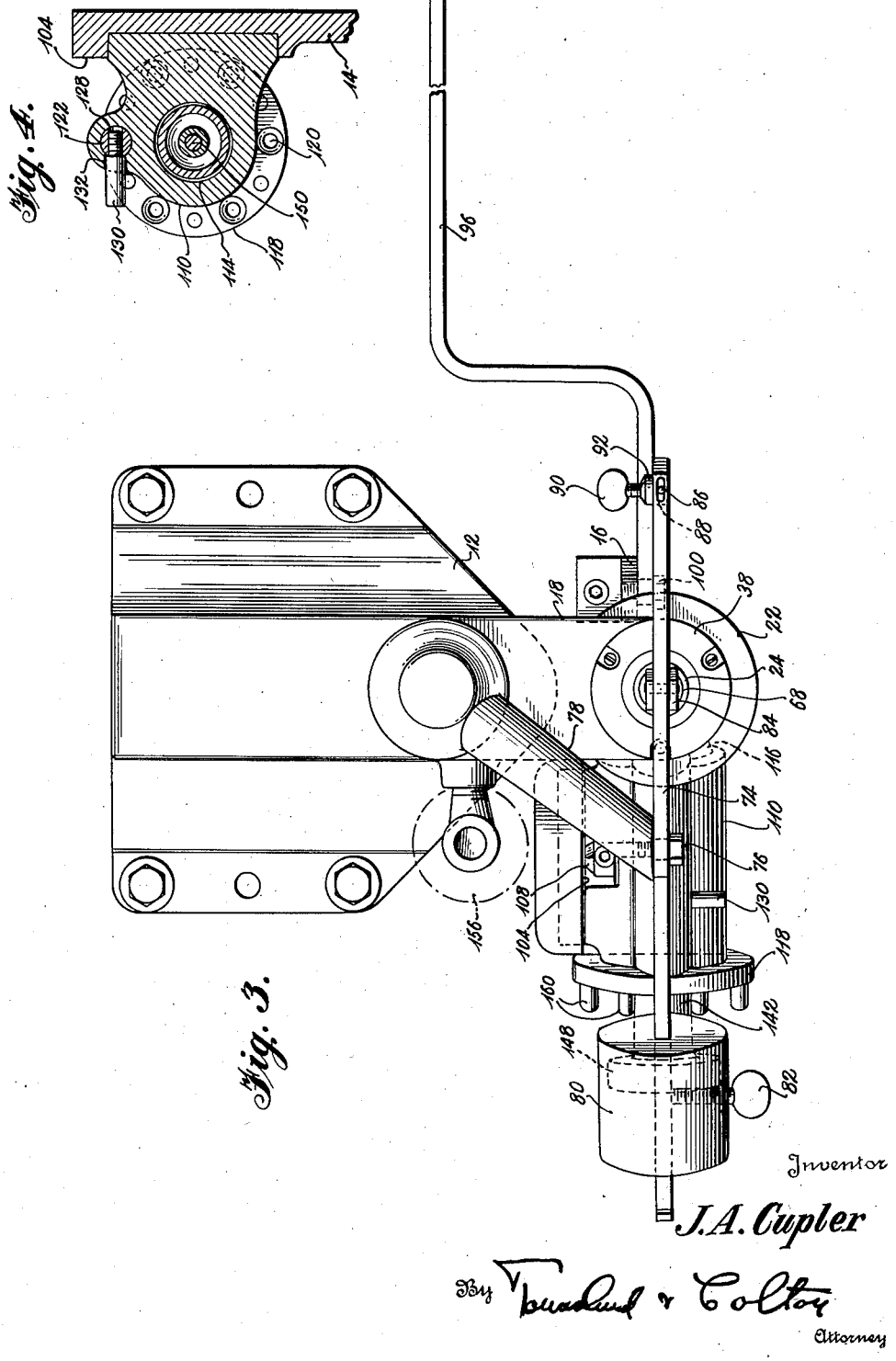
Inventor
J. A. Cupler April 20, 1948.  J. A. CUPLER  2,439,965
DRILL PRESS
Filed Jan. 9, 1943  6 Sheets-Sheet 4

Inventor
J. A. Cupler
By Townsend & Colton
Attorney

April 20, 1948.  J. A. CUPLER  2,439,965
DRILL PRESS
Filed Jan. 9, 1943  6 Sheets-Sheet 5

Inventor
J. A. Cupler
By Townsend & Colton
Attorney

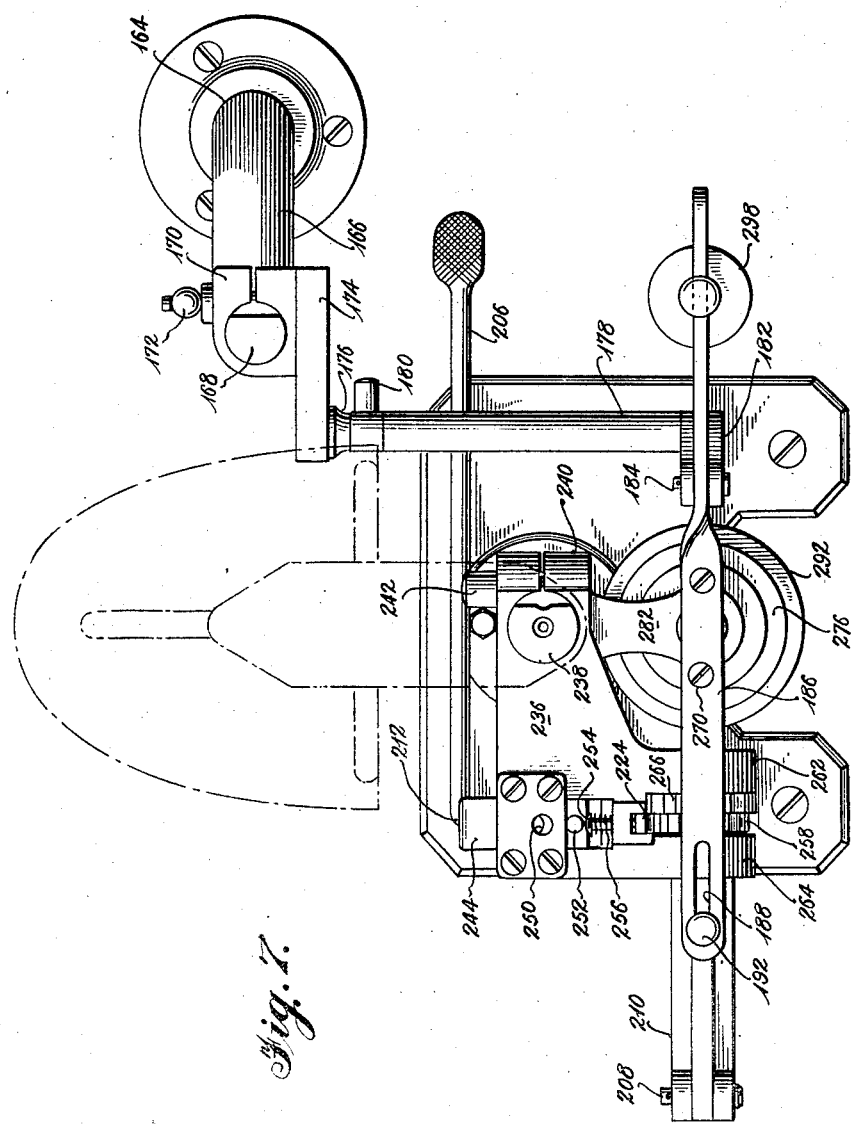

UNITED STATES PATENT OFFICE 2,439,965

DRILL PRESS

John A. Cupler, Cumberland, Md.

Application January 9, 1943, Serial No. 471,869

2 Claims. (Cl. 77—19)

This invention relates to a drill press and a work support therefor.

In drilling small openings such as those required in spinnerettes and Diesel nozzles, for example, many problems arise which are not encountered in drilling operations of the ordinary machine shop variety. In this specialized branch of the drilling art, precision is of paramount importance. The drills themselves are of such diameter that in many cases their movements must be observed by means of a microscope. The usual play and tolerances can not be countenanced, the work must be indexed with extreme accuracy, and response to the touch of the operator must be of the highest order.

The technique developed for drilling of this type contemplates feeding the rotating drill into the work by reciprocating strokes of progressively increasing length. Such procedure aids in the removal of chips and reduces the dangers of drill breakage and damage to the work.

In accordance with the present invention, there is provided a work support and a suitably mounted rotary and reciprocatory spindle, carrying a chuck for the reception of a tool at one end, and at the other end providing a bearing surface for contact with an intermediate portion of a pivoted beam. The pivoted beam is balanced, carrying an adjustable counterweight at one side of its fulcrum and being connected at the other side of its fulcrum to an operating lever, the operating lever being pivoted in turn to provide a large mechanical advantage for advancing the spindle towards the work. The spindle is rotatable with a suitably driven sleeve which is mounted in bearings, preferably of the antifriction type. The spindle is reciprocable with respect to its driving sleeve and is provided with a restitution spring for restoring it to a retracted position following the removal of an advancing force by the operating lever. A metal wear plate is preferably interposed between the beam and spindle to provide a metal-to-metal contact for purposes of precision, and at the same time preserve the more expensive and harder beam and spindle elements.

In some cases, it is desired to interconnect the beam and operating lever through a link which is pivoted at both ends, while in other cases a flexible element is preferred. In certain forms of the invention, a cam element is employed to limit movement of the spindle and to retract it from the work. Such a cam may be operated by a ratchet and pawl mechanism which receives its impulses in response to motion of the operating handle. Displaceable abutment means may also be provided to limit normal retraction of the spindle feed assembly, yet permit greater retraction under certain circumstances.

The work support may assume such form as to permit simultaneous positioning and clamping of the work with respect to its own axis as well as that of the spindle. Indexing for angularly adjusting the work about its own axis is also contemplated, and may be accomplished by mounting a collet for grasping the work in a guide which is rotatable in a housing, and providing a spring pressed detent in cooperation with a desired number of calibrated apertures for determining the positions to be imparted to the work during the drilling operations. The detent and apertures are preferably provided with complementary tapers to assure accurate positioning of the work.

A more complete understanding of the invention will result from a more detailed consideration of the structures represented in the accompanying drawings wherein:

Fig. 3 is a plan view of the drill press shown in Fig. 1;

Fig. 4 is a sectional view taken along line 4—4 of Fig. 3;

Fig. 7 is a plan view of the modification of Fig. 5.

Figure 1:
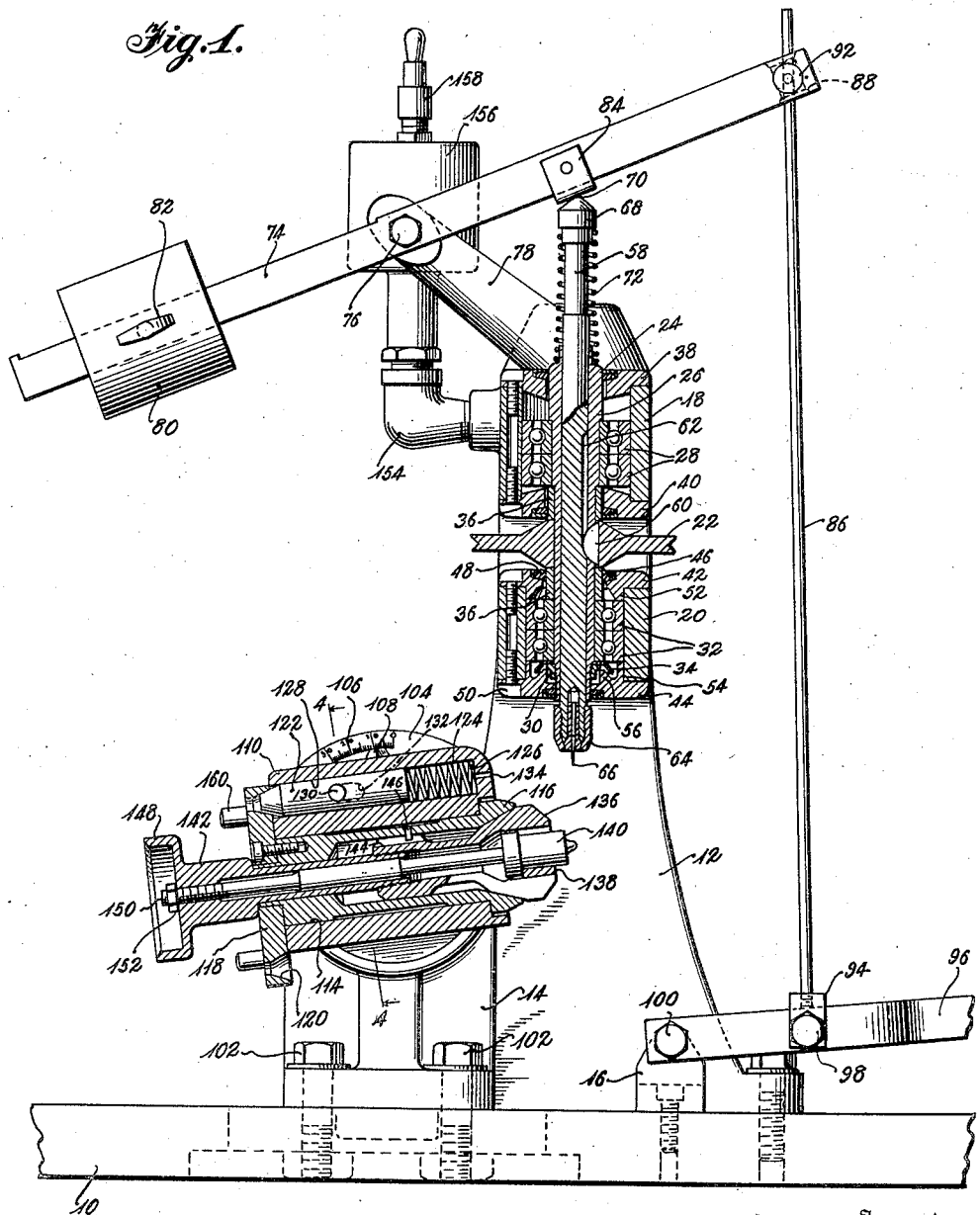
Fig. 1 is an elevation, partly in section of a drill press contemplated by the present invention.
Figure 2:
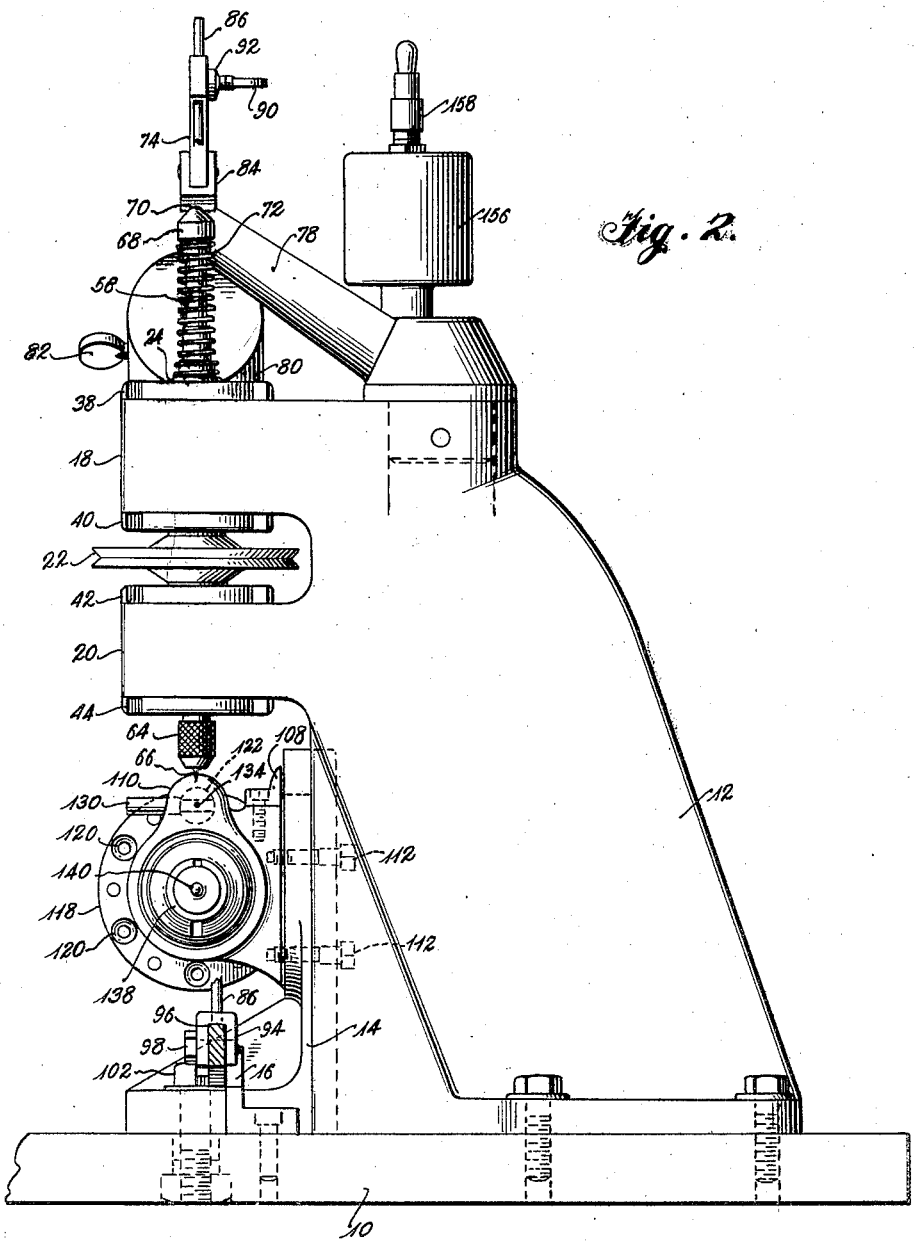
Fig. 2 is an elevation taken at right angles to Fig. 1.

In general, the apparatus depicted in Figs. 1, 2, 3 and 4 comprises a base 10 upon which are mounted a support 12 for the spindle assembly, a support 14 for the indexing assembly, a pivot block 16 for the feed assembly, a suitable microscope, not shown, and a driving motor which has not been shown.

The spindle assembly support 12 is provided with an upper housing 18 and a lower housing 20, spaced from one another sufficiently to receive between them a driving pulley 22. The housings 18 and 20 contain cylindrical bores for the reception of anti-friction bearings, preferably of the unit handled type, the outer races of which snugly engage the bores and the inner races of which are nicely fitted to the periphery of a hollow drive sleeve 24. The drive sleeve is provided with an enlarged shoulder 26 which seats upon the inner race of the uppermost bearing 28 provided in the upper housing. The lower portion of the drive sleeve is suitably threaded to receive a nut 30 which is advanced sufficiently to apply pressure against the inner race of the lowermost bearing 32 mounted in the lower housing 20. Between the nut 30 and the bearing 32, there is clamped an outwardly and downwardly skirted deflector 34 designed to prevent the escape of lubricant from the lower housing.

Between the inner race of the lowermost bearing 28 in the upper housing and the hub of the pulley 22 on the one hand, and the inner race of the uppermost bearing 32 in the lower housing and the hub of the pulley 22 on the other hand, spacing sleeves 36 are interposed to restrain the pulley against longitudinal movement with respect to the sleeve. The ends of the upper and lower housings are closed by annular plates 38, 40, 42 and 44, each of which is recessed to receive an oil retainer 46 and a cup 48 therefor. These plates are fastened with suitable screws 50 threaded into the walls of the housings. The plates 42 and 44 closing the lower housing are provided with reduced extensions 52 and 54 respectively for engaging the outer races of the bearings to retain them in their proper longitudinal positions. The lower plate 44 is also formed with an inner frustro-conical projection 56 substantially complementing the skirt of the deflector 34 to define what amounts to a labyrinth.

Centrally received through the bore of the sleeve 24 is a spindle 58 which is constrained to rotate with the sleeve 24 by a key 60 which penetrates the wall of the sleeve 58 to engage the walls of an elongated slot 62 formed in the spindle. The lower end of the spindle carries a chuck 64 for the reception of a drill 66. At the upper end of the spindle there is provided an enlarged head 68 terminating in an arcuate tip 70 which provides a bearing surface. A spring 72 is interposed between the head 68 of the spindle and the upper end of the sleeve 24 for biasing the spindle upwardly tending to retract it from the work.

The feed assembly for depressing the spindle comprises a beam or lever 74 pivotally mounted by means of a shoulder screw 76, upon an arm 78 projecting from the support 12. Adjustably carried by one arm of the lever 74 is a counterweight 80 which can be maintained in position by means of a thumb screw 82. The other arm of the lever 74 is fitted with a wear plate 84 at an intermediate position, for engagement with the arcuate tip of the spindle head during advancement and retraction of the drill. The wear plate is preferably metal, but of a somewhat softer variety than that constituting the tip of the spindle. The lever is actuated through a rod 86 which is related thereto by means of a rotatable barrel 88 to which it is fastened by a thumb screw 90 and a lock nut 92. The lower end of the rod 86 terminates in a bifurcated element 94 which is pivotally connected with an operating lever or handle 96 by means of a shoulder screw 98. The handle itself is pivoted at one end by means of a shoulder screw 100 to the pivot block 16, the opposite end of the handle serving as the medium through which the operator actuates the spindle.

By adjusting the rod 86 with the aid of the thumb screw 90 and lock nut 92, lost motion can be entirely eliminated. Adjustment of the counterweight 80 may be effected by loosening the thumb screw 82, whereupon the handle and lever system can be delicately balanced to permit the operator to combine the senses of sight and touch in performing the precision operations for which the present device is primarily intended. It should be noted that the rod 86 is pivoted to the handle 96 relatively close to its fulcrum, providing a large mechanical advantage, with the result that appreciable movement by the hand of the operator produces a relatively small movement of the spindle.

The indexing assembly carried by the support 14 is attached to the base 10 by a plurality of bolts 102. The upper portion of the support includes a face plate 104 provided with an angularly calibrated scale 106, which in cooperation with the indicator 108 attached to the housing 110, denotes the inclination of the work axis with respect to the horizontal. The housing is adjustably secured to the face plate by a plurality of bolts 112 extending through arcuate slots in the face plate into threaded openings formed in the housing. The housing 110 is provided with a cylindrical bore 114 which receives a collet guide 116 rotatable therein to assume predetermined positions in accordance with the angular spacing of the openings to be drilled. These positions are established by means of an indexing plate 118 bolted to the collet guide and containing the required number of accurately spaced tapered openings 120 which sequentially receive the complementary tapered end of a detent 122 which is biased towards its seats in the plate by means of a compression spring 124 interposed between the detent and a bearing wall 126 formed at the bottom of a bore 128 provided in the housing to receive the detent and its spring. The detent is retracted by means of a detent pin 130 extending radially therefrom through an elongated slot 132 in the housing wall. Because of the small tolerances employed throughout the construction here involved, it is desirable to provide a vent 134 to atmosphere through the bottom wall of the bore 128 to avoid the effects of compression and suction during movements of the detent. Centered within the collet guide 116 for axial movement with respect thereto is a collet 136 designed to receive a split bushing 138 to embrace the work 140 which has been depicted in the drawings as a Diesel nozzle through which openings of a very small diameter are to be drilled. The opposite end of the collet is internally threaded to receive the threaded end of a draw bar 142, and externally longitudinally kerfed to define a groove 144 for the reception of a pin 146 carried by the guide 116. The operating end of the draw bar 142 is provided with a hand wheel 148, through the center of which a locating rod 150 extends into contact with the work to locate it longitudinally. The locating rod is threaded to the draw bar 142 and following an accurate setting, is locked with respect thereto by a nut 152.

For lubricating the spindle assembly, the housing 18 is drilled and tapped to receive an elbow fitting 154 which receives an oil cup 156 having a feed adjustment 158 for regulating the flow of lubricant to the spindle, bearings and associated parts.

In operation, the drill is inserted in its chuck 64, the rod 86 connecting the handle 96 and lever 74 is adjusted in effective length to suit the depth of the openings to be drilled, and the counterweight 80 is set to properly balance the feed assembly. The indexing assembly is adjusted in inclination to the proper graduation on the scale 106, the length of the locating rod 150 is fixed with respect to the draw bar for the first position assigned to the indexing plate 118 by the detent 122. Then, assuming the jaws of the collet to be in expanded condition, the work 140 embraced by the bushing 138 is inserted in the collet and pressed into contact with the end of the locating rod 150. The draw bar 142 is then advanced by rotating the hand wheel 148, simultaneously advancing the locating rod 150 to assign the correct longitudinal position to the work, and contracting the jaws of the collet 136 by camming their inclined external surfaces against the cooperating inclined internal surface of the collet guide 116. When the work has been located and clamped in this manner, a source of power is applied to rotate the pulley 22 and the handle 96 depressed to feed the drill into the work until the opening of desired characteristics has been formed. The handle is now released and the feed assembly restored to its elevated position by the counterweight 80 assisted by the spring 72.

The detent 122 is then retracted from the tapered opening 120 by moving the detent pin 130 in the slot 132 against the force of the spring 124, whereupon the indexing plate is rotated by means of the index pins 160 until the next tapered opening is presented to the detent, at which point the spring 124 urges the detent into the opening to position the work to receive the next drilling operation. This procedure is repeated until the requisite number of openings has been drilled, whereupon the work is replaced by a new work-piece.

Figure 5:
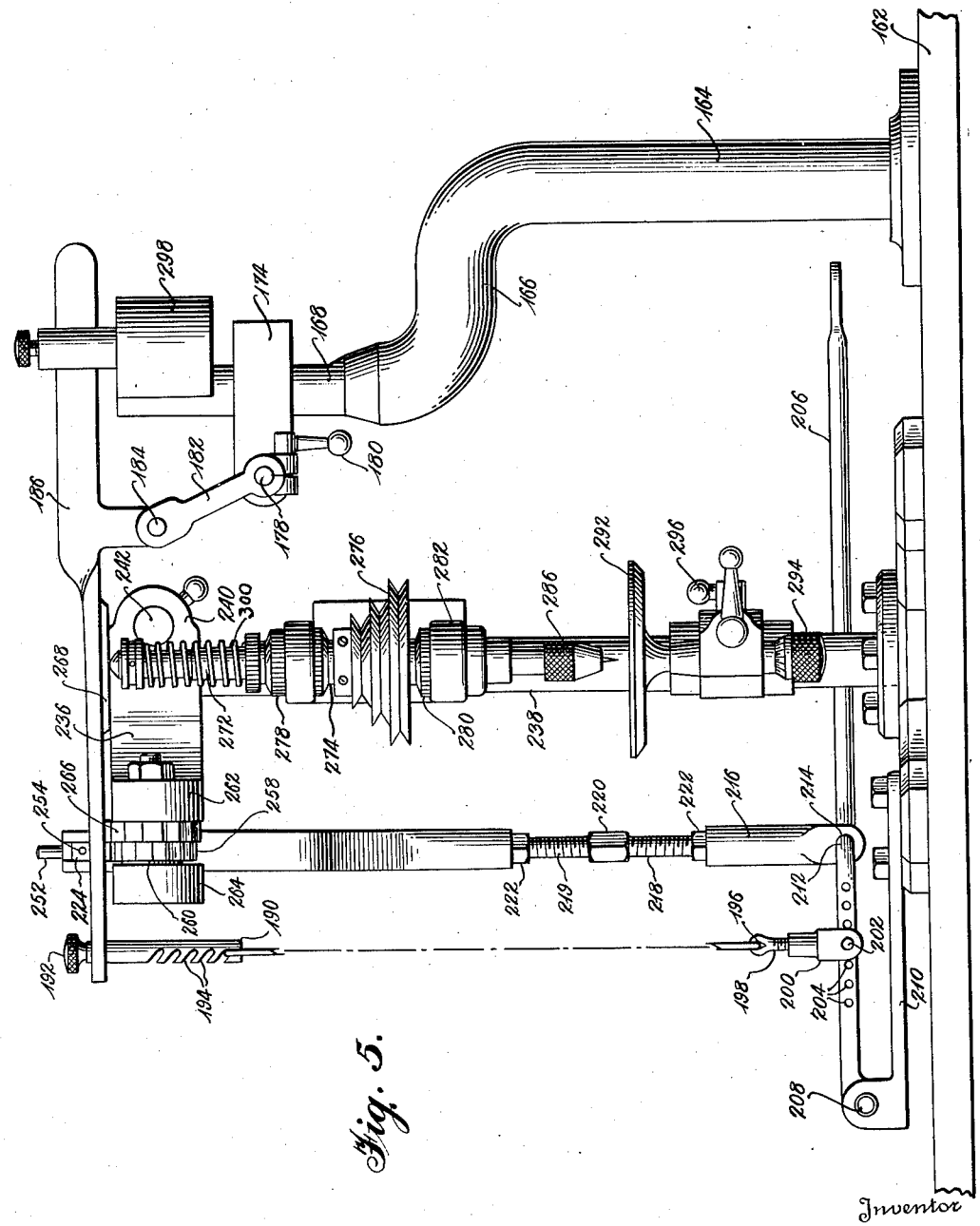
Fig. 5 is an elevation corresponding somewhat to Fig. 1 of a modification.
Figure 6:
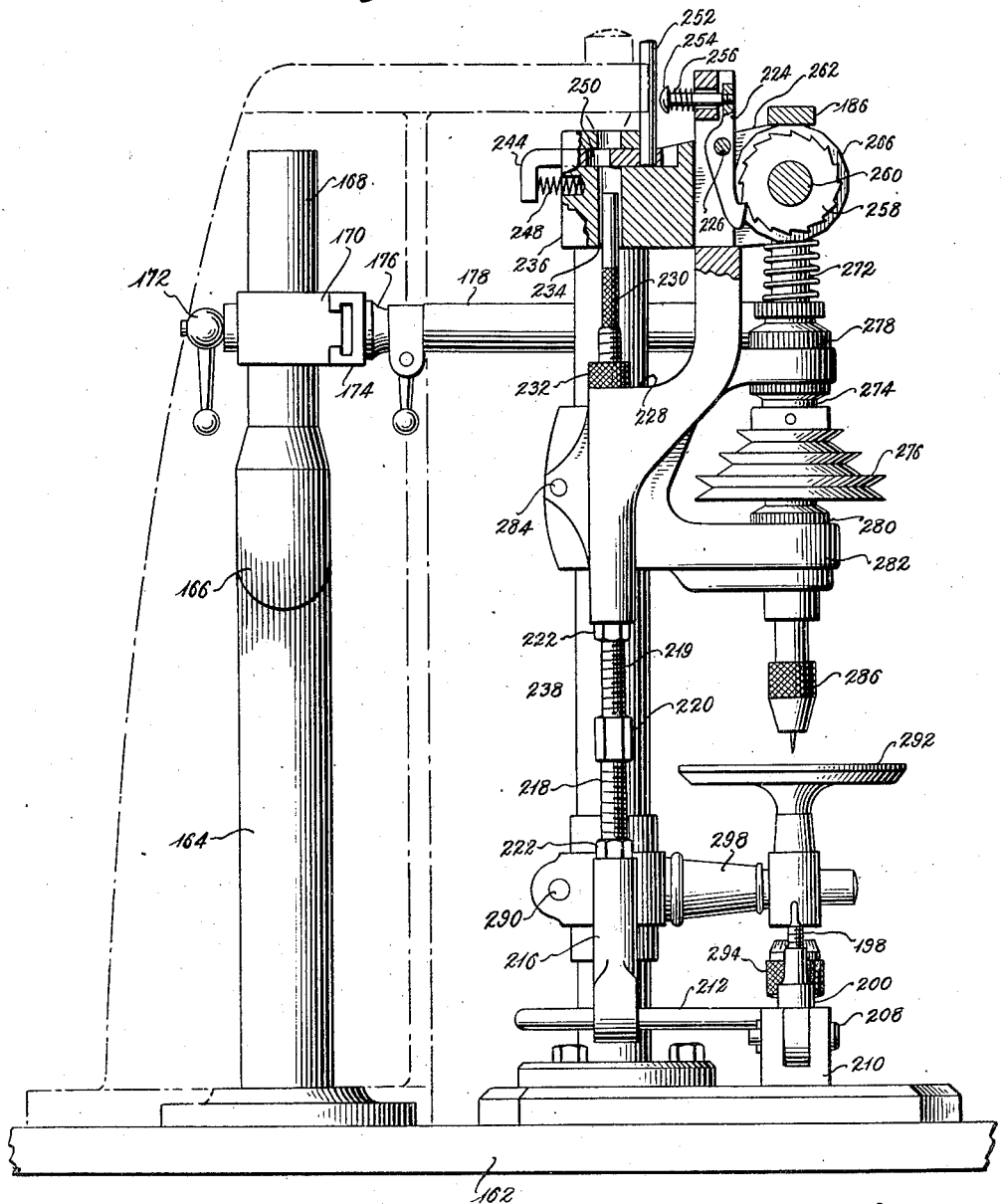
Fig. 6 is an elevation taken at right angles to Fig. 5.

Many of the principles of the foregoing embodiment may be incorporated in a semi-automatic form of the invention depicted in Figs. 5, 6 and 7 of the drawings. In these figures, the base 162 supports a suitably attached post 164, which has an offset portion 166 terminating in a vertical machined upper end 168. Adjustably secured on the upper end 168 is a split clamping collar 170, retained in a selected position by means of a screw 172. A plate 174 carried by the clamping collar in turn supports a stud 176 upon which is adjustably clamped the split end of a sleeve 178 by means of a suitable screw 180. The forward end of the sleeve is provided with an angularly disposed upstanding arm 182, the upper end of which receives a pivot pin 184 for supporting a beam 186.

One end of the beam is formed with a slot 188 to adjustably receive a depending coupling element 190 held in a selected position in the slot by a knurled thumb screw 192. The coupling element is provided with a plurality of notches 194 for reception of a flexible cable or chain (not shown) whose lower end is fastened through an eye 196 formed on a threaded bolt 198. The bolt 198 is threadedly received in a socket 200 whose lower end is perforated for reception of a pivot pin 202, selectively received in a plurality of apertures 204 formed near the fulcrum of an operating lever 206. At its fulcrum, the lever 206 is pivoted by means of a pin 208 to a plate 210 which is suitably secured to the base 162. Intermediate the socket 200 and the free end of the operating lever, the lever is provided with two right angular bends to define a crank 212 passing through an opening 214 provided in the lower end of a multipart feed bar 216.

The length of the feed bar is rendered adjustable by an interposed link 218 having oppositely threaded ends, so that when its polygonal body portion 220 is engaged by a wrench, rotation will lengthen or shorten the bar. Lock nuts 222 are provided to maintain a desired adjustment. At an intermediate portion, the bar is bent forwardly, whereupon it resumes its vertical direction, and near its upper end it is slotted to define a housing for a pawl 224 which is pivoted thereto by means of a pin 226. In the vicinity of its forwardly bent portion, the bar is provided with a horizontal seat 228 into which is threaded a limiting pin 230, an adjusted position of which is maintained by a lock nut 232. The upper end of the limiting pin is received for reciprocating movement in an opening 234 formed in a plate 236, which plate is supported from a base attached vertical column 238 and secured thereto by means of a split end 240 which is clamped to the column by means of a screw 242. The plate 236 is slotted to receive a sliding abutment 244 provided with a downturned operating end 246, between which and the plate, there is interposed a spring 248 normally biasing the abutment towards the left as viewed in Fig. 6 of the drawings. The abutment is provided with an opening 250 which is normally misaligned with the opening 234 formed in the plate, and thus the abutment normally limits the upward movements of the feed bar 216. However, when the abutment is moved to the right against the force of the spring 248, the openings 234 and 250 become aligned to permit additional upward movement of the limiting pin 230. The forward end of the abutment is fitted with an upstanding pin 252 which partakes of the movement of the abutment, so that when it is pushed to the right, it engages the head of a button 254 carried by the pawl 224, overcoming the force of a spring 256 to rotate the pawl about its pivot and effect disengagement of the pawl from its ratchet wheel 258.

The ratchet wheel 258 is rotatably carried by a shaft 260 which is supported between a pair of flanges 262 and 264 provided by the plate 236. Also rotatably carried by the shaft 260 and fixed with respect to the ratchet wheel, is a cam wheel 266. The periphery of the cam wheel is provided with a plurality of flattened surfaces which serve to limit movement of the beam 186 in one direction, and to positively actuate it in the opposite direction.

At a point between its fulcrum and the cam wheel, the beam is provided with a bearing plate 268 secured thereto by screws 270, which transmits motion to the upper end of a spindle 272. The spindle is keyed to a shaft 274 for rotation therewith, but the spindle may be reciprocated with respect to the shaft by movements of the beam imparted by the operating lever 206. The shaft 274 carries a pulley 276 which is driven by a suitable source of power. The shaft is journaled in spaced bearings 278 and 280 which are mounted in a frame 282 which is adjustably clamped to the column 238 by means of a screw 284. The lower end of the spindle receives a suitable chuck 286 into which the drills are fitted.

A support 288 is also adjustably clamped to the column 238 by means of a screw 290 for supporting a work table 292. For precision adjustments of the table height, a micrometer screw 294 is provided, and a locking screw 296 is intended to maintain any setting thus selected.

After the various adjustments have been made, the work positioned, the drill inserted and power applied, the lever 206 will be depressed to exert a pull on the coupling element 190, overcome the counterweight 298 and deflect the beam 186 to feed the drill into the work until the beam engages one of the faces of the cam wheel 266. During this movement, the pawl 224 will advance to engage the next tooth of the ratchet wheel 258. Then as pressure is removed from the operating lever 206, the counterweight tends to return the beam to its original position, the ratchet wheel rotates, the cam wheel rotates to lift the beam, and the spring 300 surrounding the spindle urges its head upwardly. When it is desired to raise the feed bar 216 above its normal limit, the abutment 244 is shifted until its opening registers with that of the plate 236 and at the same time the pin 252 retracts the pawl from its ratchet wheel. The operation is accomplished in this manner without disturbing any of the adjustments previously made.

The foregoing illustrations should not be construed as limiting the present invention beyond the scope of the appended claims.

I claim:

1. A drill press comprising a work support and a tool spindle, one end of said spindle carrying a chuck for reception of a tool and the other end of said spindle providing a bearing surface, a pivoted beam mounted adjacent said spindle and having an intermediate portion adapted for engagement with said bearing surface for feeding the tool towards said work support, an operating lever connected to said beam at one side of its pivot, said operating lever being pivoted so as to provide a large mechanical advantage for advancing said spindle, cam means for retracting said beam, and means for balancing said beam.

2. A drill press comprising a work support and a tool spindle, one end of said spindle carrying a chuck for reception of a tool and the other end of said spindle providing a bearing surface, a pivoted beam mounted adjacent said spindle and having an intermediate portion adapted for engagement with said bearing surface for feeding the tool towards said work support, an operating lever connected to said beam at one side of its pivot, said operating lever being pivoted so as to provide a large mechanical advantage for advancing said spindle, ratchet actuated cam means for retracting said beam, and means for balancing said beam.

JOHN A. CUPLER.

REFERENCES CITED

The following references are of record in the file of this patent:

UNITED STATES PATENTS

| Number | Name | Date |
| --- | --- | --- |
| 323 | Barton | July 29, 1837 |
| 255,079 | Hartley | Mar. 14, 1882 |
| 353,124 | Dickson | Nov. 23, 1886 |
| 652,533 | Chalmers | June 26, 1900 |
| 695,980 | Wilhelm | Mar. 25, 1902 |
| 802,060 | Stone | Oct. 17, 1905 |
| 892,459 | Spears | July 7, 1908 |
| 1,061,622 | Mellon | May 13, 1913 |
| 1,434,564 | Ruetschi | Nov. 7, 1922 |
| 1,576,509 | Hofmann | Mar. 16, 1926 |

FOREIGN PATENTS

| Number | Country | Date |
| --- | --- | --- |
| 6,733 | Great Britain | Mar. 3, 1900 |